US009325485B2

(12) United States Patent
Li et al.

(10) Patent No.: US 9,325,485 B2
(45) Date of Patent: Apr. 26, 2016

(54) APPARATUS AND METHOD TO ENABLE DEVICE-TO-DEVICE (D2D) DISCOVERY IN CELLULAR NETWORKS

(71) Applicant: Intel Corporation, Santa Clara, CA (US)

(72) Inventors: Qinghua Li, San Ramon, CA (US); Honggang Li, Beijing (CN); Hujun Yin, Saratoga, CA (US); Jong-Kae Fwu, Sunnyvale, CA (US); Amitav Mukherjee, Santa Clara, CA (US); Yuan Zhu, Beijing (CN); Xiaogang Chen, Beijing (CN)

(73) Assignee: Intel Corporation, Santa Clara, CA (US)

( * ) Notice: Subject to any disclaimer, the term of this patent is extended or adjusted under 35 U.S.C. 154(b) by 393 days.

(21) Appl. No.: 13/756,013

(22) Filed: Jan. 31, 2013

(65) Prior Publication Data

US 2013/0273923 A1   Oct. 17, 2013

Related U.S. Application Data

(60) Provisional application No. 61/624,185, filed on Apr. 13, 2012.

(51) Int. Cl.
*H04W 72/00* (2009.01)
*H04B 7/00* (2006.01)
(Continued)

(52) U.S. Cl.
CPC ............... *H04L 5/14* (2013.01); *H04L 5/0001* (2013.01); *H04L 5/0023* (2013.01); *H04L 5/0044* (2013.01); *H04L 5/0048* (2013.01); *H04L 5/0053* (2013.01); *H04L 5/0064* (2013.01); *H04L 5/0094* (2013.01); *H04W 4/005* (2013.01); *H04W 4/06* (2013.01); *H04W 24/02* (2013.01); *H04W 24/10* (2013.01); *H04W 28/02* (2013.01);
(Continued)

(58) Field of Classification Search
CPC ............................ H04W 72/04; H04W 76/023
USPC .................................................. 455/450, 41.2
See application file for complete search history.

(56) References Cited

U.S. PATENT DOCUMENTS

| 2010/0009675 | A1 | 1/2010 | Wijting et al. |
| 2010/0118752 | A1 | 5/2010 | Suzuki et al. |

(Continued)

FOREIGN PATENT DOCUMENTS

| WO | WO-2011036507 A1 | 3/2011 |
| WO | WO-2013155182 A1 | 10/2013 |

OTHER PUBLICATIONS

"International Application Serial No. PCT/US2013/035973, International Search Report mailed Jun. 28, 2013", 5 pgs.

(Continued)

*Primary Examiner* — Omoniyi Obayanju
(74) *Attorney, Agent, or Firm* — Schwegman Lundberg & Woessner, P.A.

(57) ABSTRACT

An apparatus and method of allowing user equipment (UE) to transmit information directly with other user equipment, using a device-to-device (D2D) mode is disclosed herein. A D2D UE (dUE1) that wishes so communicate to another UE (dUE2) in D2D mode makes various communications requests to an Evolved Node B (eNB), which can facilitate the connection between dUE1 and dUE2 by having the dUE1 measure the signals from dUE2 to help establish a D2D connection between the dUE1 and the dUE2.

24 Claims, 2 Drawing Sheets

(51) Int. Cl.
*H04L 5/14* (2006.01)
*H04W 28/08* (2009.01)
*H04W 76/02* (2009.01)
*H04W 74/08* (2009.01)
*H04W 4/06* (2009.01)
*H04L 5/00* (2006.01)
*H04W 28/02* (2009.01)
*H04W 72/04* (2009.01)
*H04W 24/10* (2009.01)
*H04W 36/08* (2009.01)
*H04W 24/02* (2009.01)
*H04W 4/00* (2009.01)
*H04W 72/08* (2009.01)
*H04L 12/18* (2006.01)
*H04W 36/00* (2009.01)

(52) U.S. Cl.
CPC .......... *H04W 28/0268* (2013.01); *H04W 28/08* (2013.01); *H04W 36/08* (2013.01); *H04W 72/04* (2013.01); *H04W 72/042* (2013.01); *H04W 72/0406* (2013.01); *H04W 72/085* (2013.01); *H04W 74/0808* (2013.01); *H04W 74/0833* (2013.01); *H04W 76/02* (2013.01); *H04W 76/023* (2013.01); *H04L 5/0037* (2013.01); *H04L 12/189* (2013.01); *H04W 36/0016* (2013.01); *H04W 76/028* (2013.01); *Y02B 60/50* (2013.01)

(56) References Cited

U.S. PATENT DOCUMENTS

| | | |
|---|---|---|
| 2010/0165882 A1* | 7/2010 | Palanki et al. ................ 370/254 |
| 2011/0145421 A1 | 6/2011 | Yao et al. |
| 2011/0223953 A1 | 9/2011 | Lee et al. |
| 2011/0275382 A1 | 11/2011 | Hakola et al. |
| 2012/0039202 A1 | 2/2012 | Song |

OTHER PUBLICATIONS

"International Application Serial No. PCT/US2013/035973, Written Opinion mailed Jun. 28, 2013", 7 pgs.

"International Application Serial No. PCT/US2013/035973, International Preliminary Report on Patentability mailed Oct. 23, 2014", 9 pgs.

"European Application Serial No. 13775652.4, Extended European Search Report mailed Nov. 26, 2015", 8 pgs.

* cited by examiner

APPARATUS AND METHOD TO ENABLE DEVICE-TO-DEVICE (D2D) DISCOVERY IN CELLULAR NETWORKS

RELATED APPLICATION

This application claims the benefit of priority under 35 U.S.C. 119(e) to U.S. Provisional Patent Application Ser. No. 61/624,185, filed on Apr. 13, 2012, which is incorporated herein by reference in its entirety.

TECHNICAL FIELD

Embodiments pertain to wireless communications. Some embodiments pertain to wireless communications directly between two or more pieces of user equipment.

BACKGROUND ART

User Equipment (UE), including mobile devices such as phones, tablets, e-book readers, laptop computers, and the like, have become increasingly common. Accompanying the increase of usage of such devices has been an increase in the usage of proximity-based applications and services. Proximity-based applications and services are based on the awareness that two or more devices/users are close to one another and desire to communicate to each other. Exemplary proximity-based applications and services include social networking, mobile commerce, advertisement, gaming, and the like. In the current art, such applications and services use traditional mobile broadband networks. Such mobile broadband networks may not result in the best performance, for both the network and for the UE.

BRIEF DESCRIPTIONS OF THE DRAWINGS

DESCRIPTION OF THE EMBODIMENTS

Figure 1:
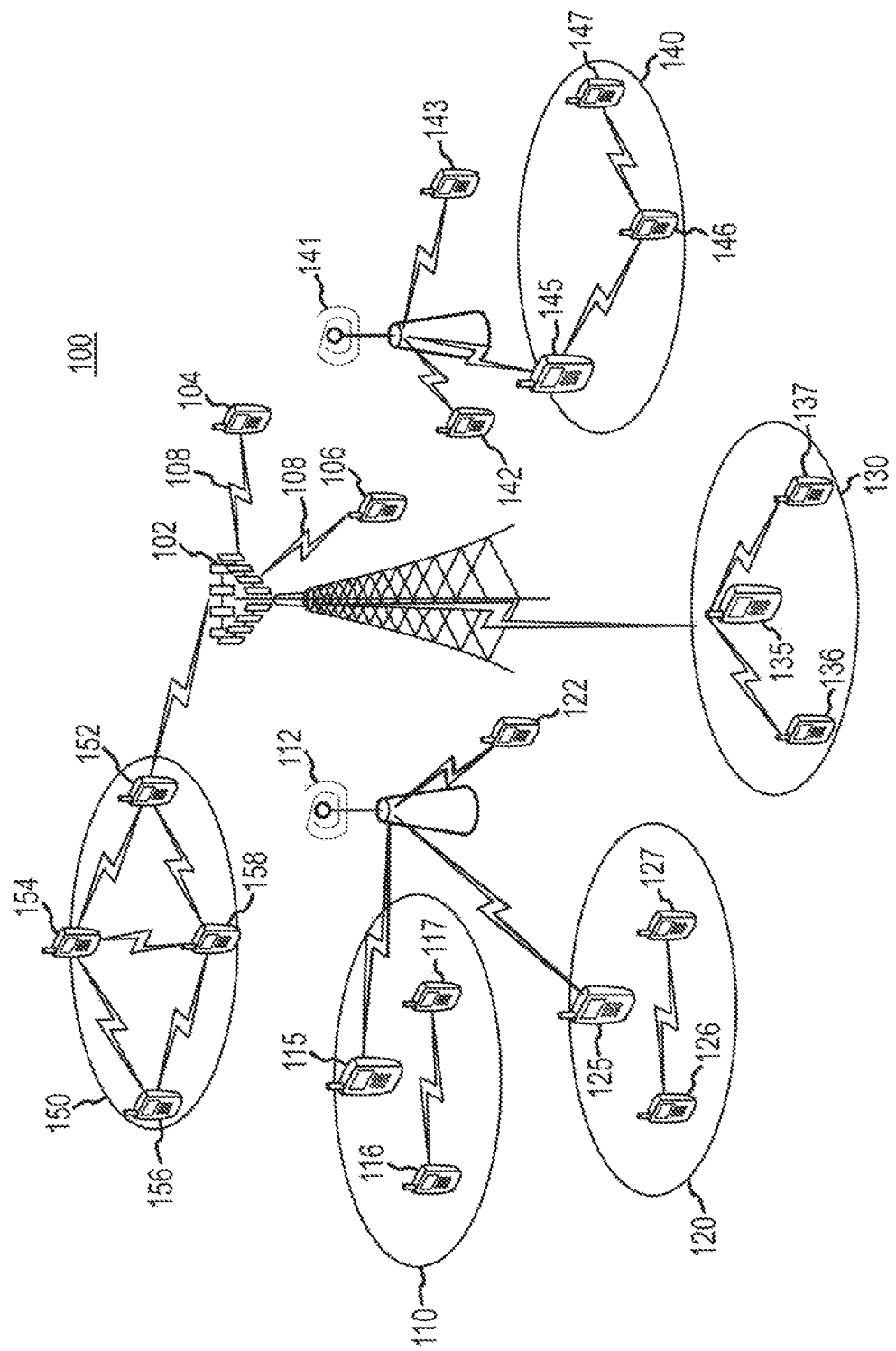
FIG. 1 is an illustrated overview of an embodiment of the present invention.

The following description and the drawings sufficiently illustrate specific embodiments to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments set forth in the claims encompass all available equivalents of those claims.

In the following detailed description, numerous specific details are set forth in order to provide a thorough understanding of the invention. However, it will be understood by those skilled in the art that the present invention may be practiced without these specific details. In other instances, well-known method, procedures, components, and circuits have not been described in detail so as not to obscure the present invention.

Although embodiments of the invention are not limited in this regard, the terms "plurality" and "a plurality" as used herein may include, for example, "multiple" or "two or more." The terms "plurality" or "a plurality" may be used throughout the specification to describe two or more components, devices, elements, units, parameters, and the like. For example, "a plurality of stations" may include two or more stations.

The 3rd Generation Partnership Project (3GPP) is a collaboration agreement established in December 1998 to bring together a number of telecommunications standards bodies, known as "Organizational Partners," that currently include the Association of Radio Industries and Business (ARIB), the China Communications Standards Association (CCSA), the European Telecommunications Standards Institute (ETSI), the Alliance for Telecommunications Industry Solutions (ATIS), the Telecommunications Technology Association (TTA), and the Telecommunication Technology Committee (TTC). The establishment of 3GPP was formalized in December 1998 by the signing of the "The 3rd Generation Partnership Project Agreement."

3GPP provides globally applicable standards as Technical Specifications and Technical Reports for a 3rd Generation Mobile System based on evolved GSM core networks and radio access technologies that they support (e.g., Universal Terrestrial Radio Access (UTRA) for both Frequency Division Duplex (FDD) and Time Division Duplex (TDD) modes). 3GPP also provides standards for maintenance and development of the Global System for Mobile communication (GSM) as Technical Specifications and Technical Reports including evolved radio access technologies (e.g., General Packet Radio Service (GPRS) and Enhanced Data rates for GSM Evolution (EDGE)). Technical Specifications for current standards related to mobile telephony are generally available to the public from the 3GPP organization.

3GPP is currently studying the evolution of the 3G Mobile System and considers contributions (views and proposals) directed toward the evolution of the UTRA Network (UTRAN). A set of high-level requirements was identified by 3GPP workshops including: reduced cost per bit; increased service provisioning (i.e., more services at lower cost with better quality); flexibility of use of existing and new frequency bands; simplified architecture with open interfaces; and reduced/reasonable terminal power consumption. A study on the UTRA & UTRAN Long Term Evolution (UTRAN-LTE, also known as 3GPP-LTE and E-UTRA) was started in December 2004 with the objective to develop a framework for the evolution of the 3GPP radio-access technology towards a high-data-rate, low-latency and packet-optimized radio-access technology. The study considered modifications to the radio-interface physical layer (downlink and uplink) such as means to support flexible transmission bandwidth up to 20 MHz, introduction of new transmission schemes, and advanced multi-antenna technologies. 3GPP-LTE is based on a radio-interface incorporating orthogonal frequency division multiplex (OFDM) techniques. OFDM is a digital multi-carrier modulation format that uses a large number of closely-spaced orthogonal sub-carriers to carry respective user data channels. Each sub-carrier is modulated with a conventional modulation scheme, such as quadrature amplitude modulation (QAM), at a (relatively) low symbol rate when compared to the radio frequency (RF) transmission rate. In practice, OFDM signals are generated using the fast Fourier transform (FFT) algorithm.

In an exemplary situation in which proximity-based applications are used, a user with a mobile device, or user equipment (UE1) becomes physically close to another mobile device, UE2. A user may wish to transfer files, play a game, or otherwise communicate to UE2 from UE1. The connection between UE1 and UE2 may be automatically initiated by an application, instead of initiated by a user. In a traditional communications network, such a communication commonly occurs through a central coordinator, such as a base transceiver station, a Node B, or an Evolved Node B (eNodeB or eNB).

However, there are several factors that may make proximity-based communication different. For example, the distance between devices is commonly small and the communication may be application-driven, rather than user-initiated (e.g., applications that automatically communicate when a second device running the same application is in proximity). There are aspects of such proximity-based communications that could be optimized.

FIG. 1 illustrates a system that combines a Device-to-Device ("D2D") network with a wireless access network, such as a Long Term Evolution (LTE) network. Mobile broadband network 100 includes a central coordinator, illustrated here as eNB 102. User equipment (UE) 104 and 106 communicate with eNB 102 via LTE communications channel 108.

Also illustrated in FIG. 1 are D2D clusters 110, 120, 130, 140, and 150. Each of the D2D clusters comprises a plurality of UEs that are capable of communicating directly with each other, without the need to communicate through eNB 102. This application will refer to a UE that has D2D capability as a dUE. A device with In FIG. 1, several different layouts of D2D clusters are shown. It should be understood that other configurations of D2D clusters are also possible. It should also be understood that a single eNB can support many more D2D clusters than are shown in FIG. 1.

Pico eNB 112 is coupled to eNB 102. Coupled to pico eNB 112 are D2D clusters 110 and 120. Within D2D cluster 110 is a D2D coordinator 115 and dUEs 116 and 117. D2D coordinator 115 serves to manage the communications between dUEs 116/117 and pico eNB 112. Within D2D cluster 120 is a D2D coordinator 125 and dUEs 126 and 127. Also coupled to pico eNB 112 is a UE 122. UE 122 is not coupled to D2D clusters 110 or 120. UE 122 may or may not have D2D capabilities.

dUEs 116 and 117 have a D2D connection with each other, where communications between dUE 116 and dUE 117 need not involve either pico eNB 112 or eNB 102. Instead, information is transmitted directly between dUE 116 and dUE 117. This set-up provides a variety of advantages. For example, because dUE 116 and dUE 117 are in close proximity to each other, they do not have to transmit data all the way to eNB 102—therefore, one or both devices can use a low-power transceiver mode, prolonging the battery lives of dUE 116 and dUE 117. In addition, because eNB 112 and eNB 102 are not involved in transmissions between dUE 116 and dUE 117, the finite bandwidth capabilities of eNB 102 and pico eNB 112 are not used. If either dUE 116 or dUE 117 needs to communicate to eNB 102 or pico eNB 112, such a communication occurs through D2D coordinator 115. Although FIG. 1 illustrates several scenarios that involve the use if a D2D coordinator, it should be understood that communication between devices may be performed without any D2D coordinator, directly under the control of an eNB, such as eNB 102 or pico eNB 112. A similar configuration is present in D2D cluster 120, between dUE 126 and dUE 127. It should be understood that there is a connection between D2D coordinator 115 and dUEs 116 and 117, although it is not shown in FIG. 1.

D2D cluster 130 comprises D2D controller 135, dUE 136, and dUE 137. In D2D cluster 130, dUEs 136 and 137 may communicate directly with each other and with D2D controller 135. D2D controller 135 serves to control the D2D connection between dUE 136 and dUE 137. D2D controller 135 may also organize multicast/broadcast transmissions with dUE 136 or dUE 137. As above, dUEs 136 and 137 and D2D controller 135 free up the bandwidth of eNB 102 by using the same space as a single traditional UE. Unlike D2D clusters 110 and 120, there is no pico eNB coupled to D2D cluster 130.

Pico eNB 141 is coupled with eNB 102, dUEs 142 and 143 and D2D cluster 140. D2D cluster 140 comprises D2D controller 145 and dUEs 146 and 147. dUEs 142 and 143 are not coupled to any other UEs. D2D controller 145 is also coupled to pico eNB 142. dUEs 146 and 147 are in a multi-hop configuration—only dUE 146 is coupled to D2D controller 145. If pico eNB wants to send data to dUE 146 it can send the data through D2D coordinator/controller dUE 145. If D2D controller 145 needs to send a signal to dUE 147, the signal is transmitted first to dUE 146.

D2D cluster 150 comprises dUEs 152, 154, 156, and 158 coupled to each other in a mesh configuration, with each of the dUEs 152, 154, 156, and 158 coupled to each other as illustrated. If a dUE needs to send data to a dUE it is not directly coupled to (e.g., dUEs 152 and 156), it can send the data through a dUE that it is connected to (e.g., dUE 154). As with all connections illustrated in FIG. 1, a D2D controller is not necessary.

With D2D clusters 110, 120, 130, 140, and 150 each operating independently, eNB 102 does not have to handle as much traffic, thereby allowing eNB 102 to service more UEs than would otherwise be possible and/or provide higher throughput to other UEs. However, the presence of multiple D2D clusters could result in an increase in inter-cell interference.

D2D Device Discovery

Figure 2:
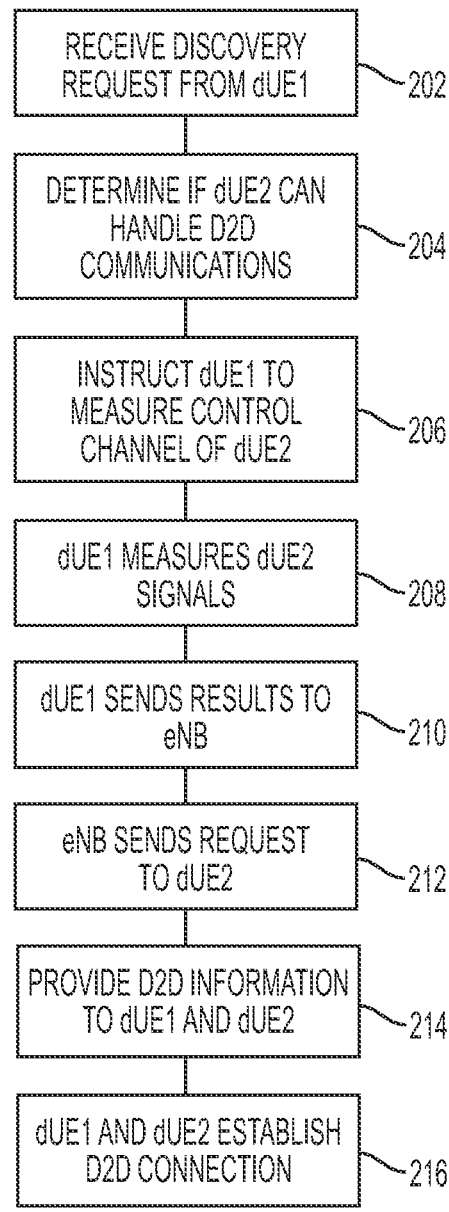
FIG. 2 is a flowchart showing the operation of an embodiment.

It would be desirable for a D2D device to become aware of other D2D devices that are in close proximity. Because a dUE is capable of communicating with an eNB, it makes sense for the eNB to assist the device discovery of the dUE. FIG. 2 is a flow chart illustrating one such method.

In FIG. 2, a dUE1 wishes to establish a connection with a dUE2. Both the dUE1 and the dUE2 are coupled to the same eNB. The dUE1 sends a discovery request to the eNB (202). The eNB determines if the dUE2 is capable of D2D communications (204). If not, then no further steps are necessary because D2D communications are not possible between the dUE1 and the dUE2. If so, then the eNB provides the dUE1 with the dUE2's control channel information. The control channel information may include any information that the dUE1 may need to evaluate the dUE2, including control channel location, feedback channel location, and the like.

For example, the eNB may tell dUE1 the identity of dUE2 such as cell radio network temporary identifier (C-RNTI) and virtual cell identifier. With this kind of identifier information, dUE1 is able to unscramble the messages sent to or from dUE2 as follows, mostly from eNB to dUE2. The control messages of dUE2 are scrambled with sequences determined by some of the identifiers of dUE2. Once the identifier is known by dUE1, dUE1 can decode the control messages so that dUE1 can find the physical location of the dUE2 transmission in frequency and time. In addition, the modulation and coding scheme of dUE2 can be known. The transmission can be for channel training such as uplink sounding, or channel training symbols (for demodulation like demodulation reference signal (DM-RS)), or ranging. The physical format of these training signals can be known by knowing dUE2 identifiers and decoding the control messages. Other transmissions may include H-ARQ ACK/NACK and channel feedbacks such as those for channel quality indicator (CQI), rank indicator (RI), precoding matrix index (PMI). In addition, the location of the data transmission of dUE2 can be known. Since the data bits are also encrypted by a layer above the physical layer in addition to the encryption i.e. the scrambling at the physical layer, the dUE1 can conduct demodulation and channel decoding for the data bits but cannot understand the meaning of the those bits. For the sake of proximity detection, measuring the received power of the data transmission is good enough. Since there two demodulation reference signals (DM RSs) for each slot in the uplink transmission (of dUE2) and the symbols in the DM RS sequence is known to dUE1 after knowing the dUE2 identifier, the DM RSs of dUE2 looks like a channel sounding symbols to dUE1. In the presence of interference, the measurements for dUE2's signal strength based on these known symbols is more accurate than those based on the unknown data symbols. However, if the DM RS is not sufficient for the signal strength measurement, the data symbols can be used without scarifying security of the system by too much because of the higher layer encryption on the data.

Thereafter, the eNB tasks the dUE1 with measuring the signal strength of the dUE2's uplink ("UL") control/feedback channel or channel training signal, such as Channel Quality Indication (CQI), Precoding Matrix Indicator (PMI), Rank Indicator (RI), (collectively referred to as CQI/PMI/RI feedback), uplink sounding signal, or uplink reference signal (206). The dUE1 measures the strength of the dUE2's UL signal at the location specified by the eNB (208). It should be noted that there may be instances where the dUE1 is aware of the allocation of the dUE2's UL control channel (e.g., Physical Uplink Control Channel (PUCCH) or UL sounding channel). In such an instance, the dUE1 may proceed directly to 208, skipping 202-206. This may be accomplished by having the dUE1 send the allocation information of the dUE2's control channel to the eNB, thus showing that the dUE1 is aware of the information about the dUE2.

After measuring the dUE2's signal strength, the dUE1 sends the results to the eNB (210). The eNB then determines if the results meet the requirements for D2D communications. Since eNB knows the transmission power level of dUE2 via a power control process, the eNB can interpret the report from dUE1. The eNB can estimate the path loss between dUE1 and dUE2 knowing the transmission power level and the received signal strength. If the path loss is small and the maximum transmission power levels of both devices are sufficient, direct communications between dUE1 and dUE2 is feasible. There are many formats for reporting the signal strength, for example, reference signal received power (RSRP), received signal strength indicator (RSSI), and reference signal received quality (RSRQ) represent signal strength or signal to interference plus noise ratio. In addition to those, Channel Quality Indicator (CQI), which essentially indicates the maximum modulation/coding scheme (MCS) that can be supported by the receiver for the current channel, may be used because the CQI takes into account the receiver's sensitivity and interference mitigation capability. Therefore, CQI is widely used in LTE channel feedback. dUE1 can send CQI to the eNB based on the signal strength measurement taking its receiver capability into account. If the reported CQI indicates that there is no MCS for the direct transmission to dUE2, the eNB knows the direct transmission is infeasible. Otherwise, since the eNB knows if dUE2 uses its full power when dUE1 estimates the CQI, the eNB can estimate the corrected MCS and corrected transmission power for the direct transmission from dUE2 to dUE1 so that the initial communications between dUE1 and dUE2 can be established.

If direct communication is feasible, the eNB sends a request to the dUE2 using the DL control channel (212). The request may include the resource allocation for a direct link between the dUE1 and the dUE2. The allocated resources may include one or multiple physical resource blocks (PRBs) in frequency and time domain. One PRB in LTE may consist of 16 subcarriers in frequency by 12-14 OFDM symbol durations in time. The PRB for D2D communications is usually located in the uplink subframe of the LTE system. The eNB then provides the resource allocation information, including the transmission power, for a direct link between the dUE1 and the dUE2 to the dUE1 (214). The dUE1 and the dUE2 can then establish a D2D connection over the allocated resources (216).

While the above description implied that the connection between the dUE1 and the dUE2 was via LTE signals, it is possible for the connection to be via other formats of communication. In such a situation, when the eNB determines if the dUE2 is capable of D2D communications (204), it also determines in what communications formats the dUE2 can use in D2D mode. In addition, when the dUE1 first requests the D2D connection (202), the dUE1 also transmits information regarding communications formats to the eNB.

The D2D connection may be in one of several different formats. For example, the dUE1 and the dUE2 are LTE devices capable of transmitting LTE signals to each other and to eNB. However, many UEs today are capable of communicating in a variety of different formats. For example, many UEs can communicate via Bluetooth to various peripherals. While Bluetooth is generally for very short-range communication and the throughput today is not very high, improvements to Bluetooth are constantly being developed and may be a suitable mechanism for D2D communications.

The D2D connection may also be via WiFi. Many UEs today have WiFi capabilities. There may be several reasons to use WiFi instead of LTE for a D2D connection. For example, a user may have a bandwidth cap on his data plan and wish to send data via WiFi in order to avoid using up his limited LTE data bandwidth. In addition, although LTE can achieve very fast data transmission speeds, WiFi speeds are close and sometimes higher. If both dUE1 and dUE2 are coupled to a WiFi network, it may be possible for the D2D connection between dUE1 and dUE2 to use WiFi protocols instead of LTE protocols.

In this case, one or both of the discovery and data communications can be done on WiFi. For the discovery, the eNB can ask both UEs to turn on their WiFi radios first. Then the eNB tells them the necessary parameters for a WiFi discovery or scanning process. These parameters are mostly for physical and MAC layers. Some examples of the physical layer parameters are the channel index of the selected WiFi channel and 802.11 spec version, e.g. 802.11a/b/g/n/ac, the UEs should use. For MAC layer, the communications between the two UEs can be configured as infrastructure mode, or ad-hoc mode, or others. The eNB needs to tell the UEs which mode should be used and what WiFi IDs the UE should use such as basic service set identifier (BSSID) and destination address (DA) in infrastructure mode and group owner ID in ad-hoc mode. The eNB may tell one UE to be the access point or group owner for sending out beacons. Furthermore, one of the scanning modes, i.e., passive scanning or active scanning, may be specified by the eNB for the discovery. Since eNB can tell both UEs about the physical and MAC layer parameters such as 802.11 version and ID, the passive scanning is more desirable than the active scanning. One UE can send a beacon at the selected channel and the other UE just listens to the channel for the discovery. For data communications, the UEs may establish WiFi connection first over physical and MAC layers. The eNB or the LTE network (server) can assist or speed up the authentication of the UE. Since both UEs are connected to the eNB and already passed the LTE authentication, the authentication efforts for the UE on WiFi can be minimized.

The following examples pertain to further embodiments.

In one embodiment, user equipment may comprise processing circuitry to couple the user equipment to a second user equipment (dUE2) in a device-to-device (D2D) configuration, wherein the processing circuitry is arranged to: receive control channel information regarding the dUE2 from an evolved Node B (eNB) for a D2D connection; measure signal strength information regarding the dUE2; and transmit information determined at least partially by said signal strength information to the eNB.

In one embodiment, the signal strength information is measured from a control/feedback channel of the dUE2.

In one embodiment, the signal strength information is measured from a channel training signal from the dUE2; and further wherein the channel training signal is selection from: a Channel Quality Indicator (CQI), a Precoding Matrix Indicator (PMI), a Rank Indicator (RI), an uplink sounding signal, or an uplink reference signal.

In one embodiment, the processing circuitry is further arranged to: receive D2D information from the eNB; and establish the D2D connection with the dUE2 using the D2D information.

In one embodiment, the D2D information comprises information to allow an LTE connection to dUE2.

In one embodiment, the D2D information comprises information to allow a WiFi connection to dUE2.

In one embodiment, the control channel information includes allocation information of the Physical Uplink Control Channel (PUCCH) of the dUE2.

In one embodiment, the user equipment is further arranged to: transmit signal strength information to the evolved Node B (eNB).

In one embodiment, the D2D information comprises information to allow a WiFi connection to dUE2.

In another embodiment, a method for coupling a first user equipment (dUE1) to a second user equipment (dUE2) in a device-to-device (D2D) cluster operating within a Long Term Evolution (LTE) cell may comprise: receiving a request from the dUE1 to communicate with the dUE2 in a D2D cluster; sending first information regarding the dUE2 to the dUE1; receiving second information from the dUE1 regarding communications between the dUE1 and the dUE2; allocating a set of resources for D2D use by dUE1 and dUE2; and transmitting information regarding the set of resources to both dUE1 and dUE2.

The method may be performed by an evolved node (eNB). In one embodiment, the first information comprises allocation information regarding the Physical Uplink Control Channel (PUCCH) of the dUE2.

In one embodiment, the first information is selected from Channel Quality Indication information (CQI), Precoding Matrix Indicator information (PMI), and Rank Indicator information (RI).

In one embodiment, the second information comprises signal strength information between the dUE1 and the dUE2. In one embodiment, the set of resources comprises a set of LTE resources.

In one embodiment, the set of resources comprises a set of WiFi resources. In one embodiment, sending first information regarding the dUE2 to the dUE1 is skipped if the request from the dUE1 contains the first information regarding the dUE2.

In another embodiment, an evolved Node B (eNB) may comprise: a transceiver; and processing circuitry adapted to: receive a request from a first user equipment (dUE1) to communicate with a second user equipment (dUE2) in a device to device (D2D) cluster; send first information regarding dUE2 to dUE1; receive second information from dUE1 regarding communications between dUE1 and dUE2; allocate a set of resources for D2D use by dUE1 and dUE2; and transmit information regarding the set of resources to both dUE1 and dUE2, wherein said information regarding the set of resources enables dUE1 and dUE2 to send and receive communications in a D2D mode.

In one embodiment, the transmit information regarding the set of resources allows D2D communication via LTE.

In one embodiment, the transmit information regarding the set of resources allows D2D communication via WiFi.

In one embodiment, the first information comprises allocation information regarding the Physical Uplink Control Channel (PUCCH) of dUE2.

In one embodiment, the uplink information is selected from Channel Quality Indication information (CQI), Precoding Matrix Indicator information (PMI), and Rank Indicator information (RI).

While certain features of the invention have been illustrated and described herein, many modifications, substitutions, changes, and equivalents may occur to those skilled in the art. It is, therefore, to be understood that the appended claims are intended to cover all such modifications and changes as fall within the scope of the invention.

We claim:

1. User equipment comprising processing circuitry to couple the user equipment to a second user equipment (dUE2) in a device-to-device (D2D) configuration, wherein the processing circuitry is arranged to:
    receive control channel information regarding the dUE2 from an evolved Node B (eNB) for a D2D connection;
    measure signal strength information from an uplink control channel transmitted by the dUE2;
    transmit the signal strength information to the eNB; and
    in response to transmission of the signal strength information, receive from the eNB allocation of a set of resources for D2D use by the UE and the dUE2 based on the signal strength information, the set of resources comprising a corrected modulation and coding scheme (MCS) at corrected transmission power for D2D use by the UE and dUE2 in response to the signal strength information indicating a particular MCS to use for D2D use by the UE and dUE2, wherein the allocation of the set of resources from the eNB is unreceived in response to the signal strength information failing to indicate a usable MCS for D2D use by the UE and dUE2.

2. The user equipment of claim 1 wherein the signal strength information is measured from a channel training signal from the dUE2; and
    further wherein the channel training signal is selected from: a Channel Quality Indicator (CQI), a Precoding Matrix Indicator (PMI), a Rank Indicator (RI), an uplink sounding signal, or an uplink reference signal.

3. The user equipment of claim 1 wherein the processing circuit is further arranged to:
    receive D2D information from the eNB; and
    establish the D21) connection with the dUE2 using the D21) information.

4. The user equipment of claim 3 wherein the D2D information comprises information to allow a D2D connection via a Long Term Evolution (LTE) network to the dUE2.

5. The user equipment of claim 3 wherein said D2D information comprises information to allow a D2D connection via WiFi to the dUE2.

6. The user equipment of claim 1 wherein the control channel information includes allocation information of a Physical Uplink Control Channel (PUCCH) of the dUE2.

7. A method for coupling a first user equipment (dUE1) to a second user equipment (dUE2) in a device-to-device (D2D) cluster operating within a Long Term Evolution (LTE) cell, said method comprising:
receiving a request from the dUE1 to communicate with the dUE2 in a D2D cluster;
sending first information to the dUE1 regarding allocation information for a Physical Uplink Control Channel (PUCCH) of the dUE2;
receiving second information from the dUE1 regarding communications between the eNB and the dUE2 based on the first information;
determining whether the second information indicates a usable modulation and coding scheme (MCS) to use for D2D use by the dUE1 and dUE2;
allocating a set of resources for D2D use by the dUE1 and the dUE2 based on the first and second information the set of resources determined by estimating a corrected MCS and corrected transmission power for D2D use by the dUE1 and dUE2 in response to determining that the second information indicates a particular MCS to use for D2D use by the dUE1 and dUE2, and refraining from allocating the set of resources in response to a determination that the second information fails to indicate a usable MCS for D2D use by the dUE1 and dUE2; and
transmitting information regarding the set of resources to both the dUE1 and the dUE2.

8. The method of claim 7 wherein the method is performed the eNB.

9. The method of claim 7 wherein the first information is selected from a Channel Quality Indication information (CQI), a Precoding Matrix Indicator information (PMI), and a Rank Indicator (RI).

10. The method of claim 7 wherein the second information comprises signal strength information between the eNB and the dUE2.

11. The method of claim 7 wherein the set of resources comprises a set of LTE resources.

12. The method of claim 7 wherein the set of resources comprises a set of WiFi resources.

13. The method of claim 7 wherein sending first information regarding the dUE2 to the dUE1 is skipped if the request from the dUE1 contains the first information regarding the dUE2.

14. An evolved Node B (eNB) comprising:
a transceiver; and
processing circuitry adapted to:
receive a request from a first user equipment (dUE1) to communicate with a second user equipment (dUE2) in a device to device (D2D) cluster;
send first information to the dUE1 regarding allocation information for a Physical Uplink Control Channel (PUCCH) of the dUE2;
receive second information from the dUE1 regarding communications between the eNB and the dUE2 based on the first information;
determine whether the second information indicates a modulation and coding scheme (MCS) to use for D2D;
allocate a set of resources for D2D use by the dUE1 and the dUE2 based on the second information, the allocation comprising a corrected MCS and corrected transmission power for D2D use by the dUE1 and dUE2 in response to a determination that the second information indicates an MCS to use for D2D use by the dUE1 and dUE2, and refrain from allocation of the set of resources and transmission of the information regarding the set of resources in response to a determination that the second information fails to indicate a MCS for D2D use by the dUE1 and dUE2; and
transmit information regarding the set of resources to both the dUE1 and the dUE2, wherein said information regarding the set of resources enables the dUE1 and the dUE2 to send and receive communications in a D2D mode.

15. The evolved node B of claim 14 wherein the information regarding the set of resources allows D2D communication via LTE.

16. The evolved node B of claim 14 wherein the information regarding the set of resources allows D2D communication via WiFi.

17. The user equipment of claim 1 wherein the processing circuitry is arranged to receive from the eNB an indication of whether each of discovery and D2D data communications is to be performed using WiFi.

18. The user equipment of claim 1 wherein the processing circuitry is arranged to receive from the eNB which of infrastructure and ad-hoc mode to use, and WiFi identification (ID) to use, the WiFi ID including a basic service set identifier (BSSID) and a destination address (DA) in infrastructure mode and a group owner ID in ad-hoc mode.

19. The user equipment of claim 1 wherein the processing circuitry is arranged to reduce Wifi authentication based on the UE passing Long Term Evolution (LTE) authentication.

20. The user equipment of claim 1 wherein the processing circuitry is arranged to receive from the eNB a request for the UE to turn on a WiFi radio and subsequently to receive from the eNB parameters for one of a WiFi discovery and a scanning process.

21. The user equipment of claim 1 wherein the processing circuitry is arranged to receive from the eNB an indication for the UE to be one of an access point and group owner for sending out beacons.

22. The user equipment of claim 1 wherein the processing circuitry is arranged to receive from the eNB an indication of which of passive or active scanning is to be used by the UE for discovery.

23. A non-transitory computer-readable storage medium that stores instructions for execution by one or more processors of an evolved NodeB (eNB) to communicate with user equipment (UE), the one or more processors to configure the eNB to:
receive a request from the dUE1 to communicate with the dUE2 in a D2D cluster;
send first information to the dUE1 regarding allocation information for a Physical Uplink Control Channel (PUCCH) of the dUE2;
receive second information from the dUE1 regarding communications between the eNB and the dUE2 based on the first information;
determine whether the second information indicates a usable modulation and coding scheme (MCS) to use for D2D use by the dUE1 and dUE2,
allocate a set of resources for D2D use by the dUE1 and the dUE2 based on the first and second information, the set of resources determined by estimating a corrected MCS and corrected transmission power for D2D use by the dUE1 and dUE2 in response to determining that the second information indicates a particular MCS to use for D2D use by the dUE1 and dUE2, and refraining from allocating the set of resources in response to a determination that the second information fails to indicate a usable MCS for D2D use by the dUE1 and dUE2; and transmit information regarding the set of resources to both the dUE1 and the dUE2.

24. The medium of claim 23 wherein the one or more processors further configure the eNB to transmit to one of the dUE1 and dUE2 one of:

an indication of whether each of discovery and D2D data communications is to be performed using WiFi, and which of infrastructure and ad-hoc mode to use, and WiFi identification (ID) to use, the WiFi ID including a basic service set identifier (BSSID) and a destination address (DA) in infrastructure mode and a group owner ID in ad-hoc mode.

* * * * *